Oct. 2, 1956  D. L. COLEMAN  2,765,191
TONNEAU SHIELD
Filed Jan. 5, 1954  2 Sheets-Sheet 1

Dudley L. Coleman
INVENTOR.

Oct. 2, 1956 D. L. COLEMAN 2,765,191
TONNEAU SHIELD
Filed Jan. 5, 1954 2 Sheets-Sheet 2
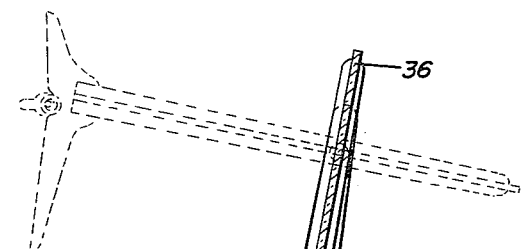
*Fig. 3*
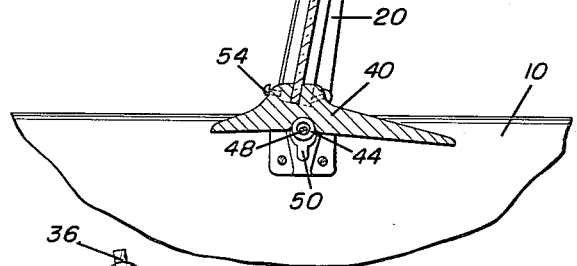
*Fig. 4*
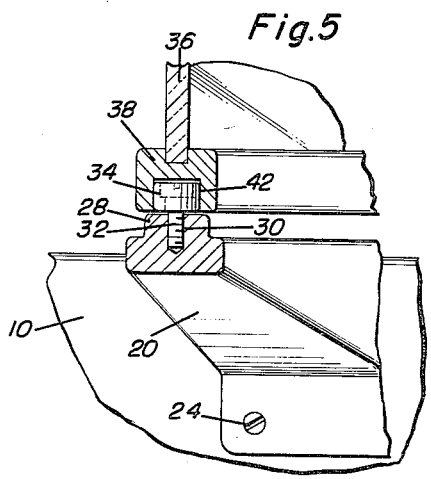
*Fig. 5*
Dudley L. Coleman
INVENTOR.
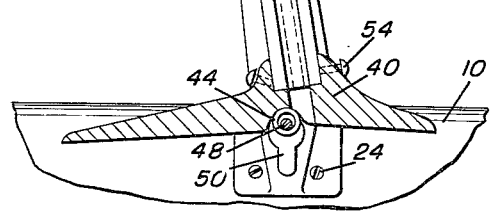
BY
Attorneys

United States Patent Office 2,765,191
Patented Oct. 2, 1956

2,765,191

TONNEAU SHIELD

Dudley L. Coleman, Spring Lake, N. J., assignor of twenty percent to Henry W. Sayrs, Belmar, N. J.

Application January 5, 1954, Serial No. 402,347

2 Claims. (Cl. 296—85)

This invention relates to a tonneau shield and more specifically provides an auxiliary windshield for attachment to vehicle bodies in rearwardly spaced relation to the front windshield.

An object of this invention is to provide a tonneau shield for attachment between the vehicle body side walls wherein the shield may be pivoted and slidably adjusted in relation to the vehicle body.

A further object of this invention is to provide a tonneau shield having a transparent auxiliary windshield and projecting flanges along the bottom thereof in the shape of a cowl member.

Yet another object of this invention is to provide a tonneau shield which is pivotally and slidably mounted on vertically extending posts adjacent the mid-portion of the vehicle body and including means for selectively locking the shield in its operative position or permitting the shield to pivot and slide wherein passengers may enter or egress from the rear passenger seat.

A still further object of this invention is to provide a tonneau shield which is simple in construction, easy to install, simple in operation, universally adapted for attachment to various type vehicles and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a transverse, vertical section taken substantially along section line 3—3 of Figure 2 showing the details of construction of the cowl member and the position of the device when in its inoperative position;

Figure 4 is a side elevational view taken substantially along the plane indicated by the section line 4—4 showing the longitudinal slot and the drive roller positioned therein; and Figure 5 is a detailed top plan section taken substantially along section line 5—5 showing the details of construction of the longitudinal slot and the roller on the projecting stud positioned therein.

Figure 1:
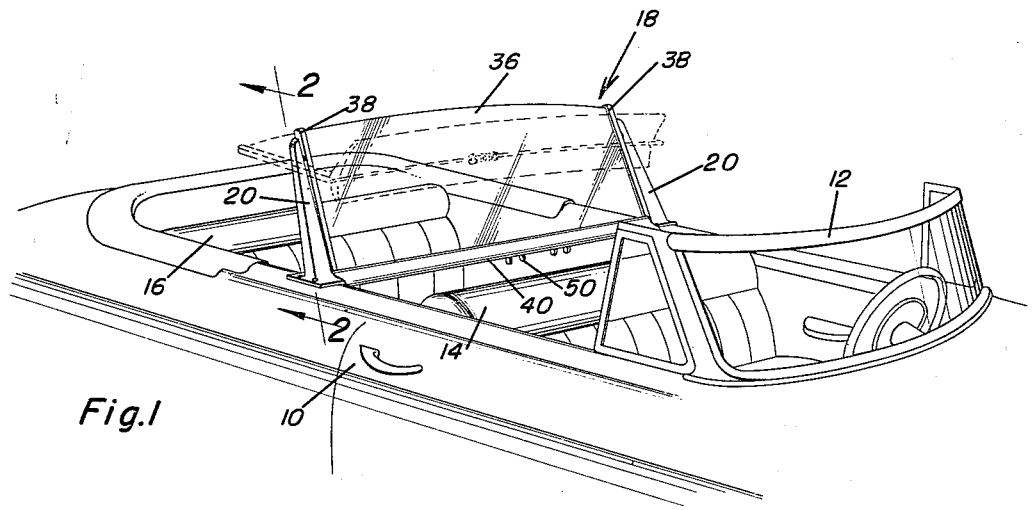
Figure 1 is a perspective view of a convertible vehicle body having the tonneau shield of this invention installed thereon.

Referring now specifically to the drawings, it will be seen that the numeral 10 generally designates a convertible automobile vehicle body having a front windshield assembly 12, a front seat 14, a rear seat 16 and an auxiliary windshield or tonneau shield assembly 18, secured to the upper side edges of the vehicle body 10 in rearwardly spaced relation to the front windshield 12 and slightly rearwardly of the front seat 14.

Figure 2:
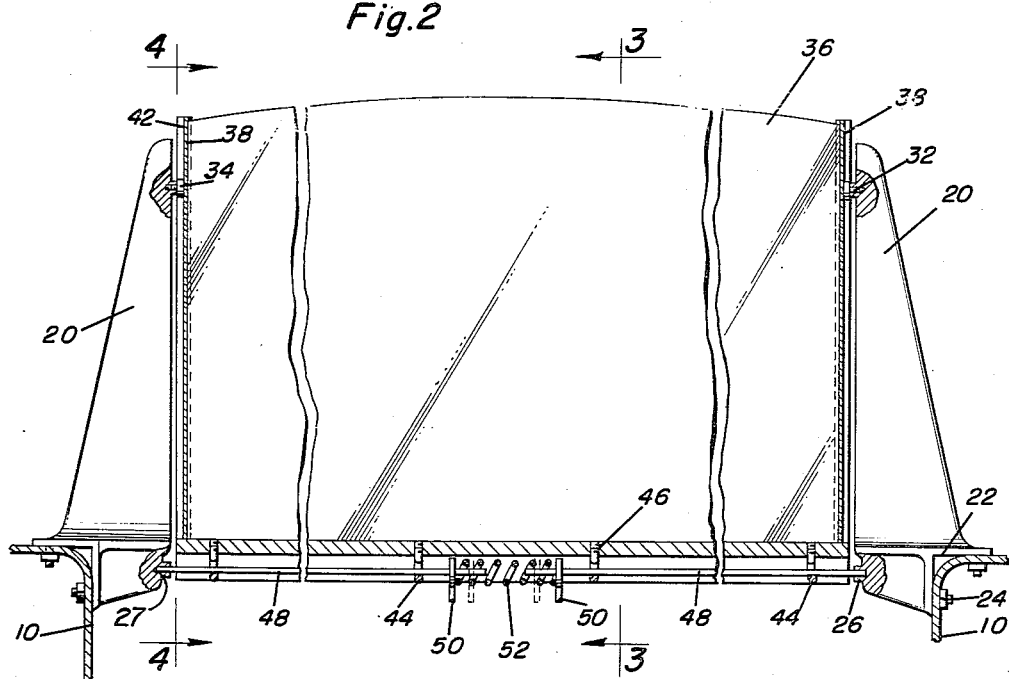
Figure 2 is a transverse, vertical section taken substantially along section line 2—2 of Figure 1 showing some of the details of construction of the locking means.

Referring now specifically to Figures 2-5, the auxiliary windshield 18 or tonneau shield includes a pair of vertically upstanding posts 20 having a right angular relieved portion 22 at the bottom and outer ends for attachment to the upper side edges of the vehicle body 10, by utilization of suitably fastening means 24. On each of the posts 20 a projection 26 is formed adjacent the lower end thereof and has a socket 27 therein for a purpose described herein. Adjacent the upper end of each of the posts 20 is provided an inwardly projecting stud 28. The inwardly projecting stud 28 includes a threaded bore 30 for receiving a threaded screw 32 having a headed portion securing and journalling a roller 34 thereon. An elongated transparent shield 36 is positioned between the posts 20 and includes a frame member 38 along the vertical edges thereof and a bottom member 40 along the lower edge thereof. The vertical portion 38 of the frame includes an elongated longitudinal slot 42 for pivotally receiving and slidably positioning the roller 34 therein. The cowl member 40 is provided with a plurality of eye members 44 threadably positioned in threaded apertures 46 for slidably receiving a pair of transversely aligned locking rods 48. The remote ends of the locking rods 48 are adapted for selective insertion in the socket formed by the projection 26. Adjacent the inner and adjacent ends of the locking rods 48 is provided an offset handle member 50 and the rods 48 project inwardly of the handle members 50 for receiving a coil compression spring 52 between the handle member 50 and surrounding the projecting ends of the rods 48. The vertical frame member 38 may be secured to the bottom cowl member 40 by suitable fastening means 54 thereby encasing the shield 36 along three sides thereof in a stable and rigid condition.

It will be understood that the various elements of the device may be constructed of suitable materials and the particular shape and size thereof is optional for different sized cars. The handle members 50 may be manipulated from either side of the vehicle 10 wherein the passengers may have access to the rear seat 16 and the rollers 34 permit the shield 18 to be positioned quickly and easily in the operative and inoperative position.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A tonneau shield for a vehicle body comprising a pair of vertically extending posts attached to said body at each side, a shield pivotally and slidably mounted between said posts, and means for selectively locking said shield in an upright position, said shield being provided with a bottom member having projecting cowl flanges, said locking means including a plurality of depending transversely aligned ring member mounted on said bottom member, a pair of movable rod members slidably mounted in said ring members, each post having a socket for receiving remote ends of said rods, resilient means urging said rods outwardly into engagement with said sockets, and handle means on said rods for moving said rods against said resilient means thereby releasing the ends of the rods from the sockets and permitting said bottom member and shield to move in relation to said posts.

2. A tonneau shield for a vehicle body comprising a pair of vertically extending posts attached to said body at each side, a shield pivotally and slidably mounted between said posts, and means for selectively locking said shield in an upright position, said shield having a frame extending along the bottom and end edges thereof, each end edge of said frame having a longitudinal slot therein, and a projection on each post slidably and pivotally receivable in the slots for pivotal and sliding movement of said frame and shield in relation to said posts, said locking means including a plurality of depending ring members mounted on the bottom of the frame in transverse alignment, a pair of movable rod members slidably mounted in said ring members, each of said posts having a socket for receiving remote ends of said rods, resilient means urging the remote ends of the rods into the sockets, and handle means on said rod for moving the remote ends of said rods out of engagement with sockets thereby permitting said frame and shield to move in relation to said posts.

References Cited in the file of this patent

UNITED STATES PATENTS

| | | |
|---|---|---|
| 798,447 | Pfleghar | Aug. 29, 1905 |
| 1,031,020 | Murphy | July 2, 1912 |
| 2,641,502 | Gunion et al. | June 9, 1952 |

FOREIGN PATENTS

| | | |
|---|---|---|
| 522,433 | France | Mar. 31, 1921 |
| 624,254 | France | Apr. 2, 1927 |
| 540,473 | Great Britain | Oct. 17, 1941 |